UNITED STATES PATENT OFFICE.

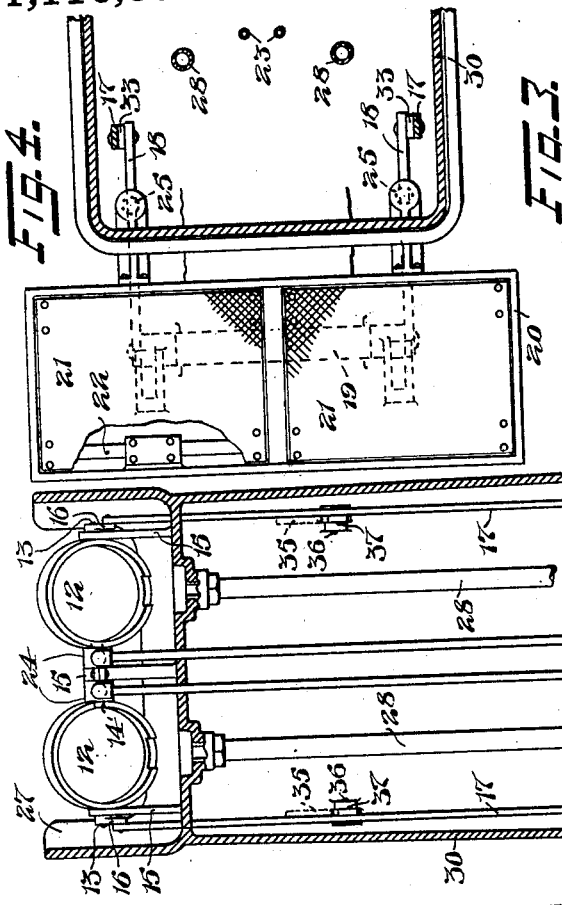

ALBERT M. TAYLOR, OF BOSTON, MASSACHUSETTS.

WATERING-TROUGH.

1,116,858.

Specification of Letters Patent. Patented Nov. 10, 1914.

Application filed June 24, 1913. Serial No. 775,511.

*To all whom it may concern:*

Be it known that I, ALBERT M. TAYLOR, a citizen of the United States, and a resident of Boston, in the county of Suffolk and State of Massachusetts, have invented certain new and useful Improvements in Watering-Troughs, of which the following is a specification.

This invention relates to live stock watering apparatus comprising a movable receptacle or bucket which is held in position to discharge its contents when not in use, and is movable to a water-retaining position either automatically or manually, means being provided for discharging water into the bucket when the latter is in its receiving position and the bucket being drained or emptied when its use is no longer required, the supply of water being cut off by the movement of the bucket to its discharging position so that the waste of water involved by the constant supply of water as usual in public drinking troughs is obviated and anything remaining in the bucket is discharged after each use of the bucket.

The invention has for its object to provide an effective watering apparatus of this character, of simple and relatively inexpensive construction.

The invention consists in the improvements which I will now proceed to describe and claim.

Of the accompanying drawings:—Figure 1 represents a side elevation partly in section of an apparatus embodying my invention. Fig. 2 represents a section on line 2—2 of Fig. 1, and an elevation of the parts at the left of said line. Fig. 3 represents a top plan view, parts being broken away and shown in section. Fig. 4 represents a section on line 4—4 of Fig. 1. Fig. 5 represents a detail section on line 5—5 of Fig. 2, on a larger scale. Fig. 6 represents a section on line 6—6 of Fig. 3.

Similar reference characters indicate the same parts in all the figures.

In the drawings:—12 represents a bucket or receptacle mounted to swing on suitable fixed supports or bearings so that the bucket may occupy a discharging position as indicated by full lines in Figs. 1 and 2, the mouth of the bucket being turned to one side, or a retaining position as shown by dotted lines in Fig. 1, the mouth of the bucket being at the top. The bucket is preferably provided with trunnions 13 and 14 mounted to turn in fixed bearings 15. The trunnion 13 is provided with a crank arm 16 which is connected by a rod 17 with one arm of a lever 18 which is pivoted at 19 in a casing 20 forming a chamber below the surface of the ground adjacent to the bucket. The fixed bearings 15 are elevated above the surface of the ground to a sufficient extent to permit a horse to conveniently drink from the bucket 12.

21 represents a platform yieldingly supported horizontally in a raised position by two springs 22, and covering the chamber 20, said platform bearing on one arm of the lever 18, which is of the bell crank form shown by Fig. 1.

23 represents a water supply pipe which extends from a point below the surface of the ground upwardly to a sleeve or valve casing 24 surrounding the trunnion 14. The water supply pipe 23 is provided with a controlling cock or valve 31, the movable member of which has a crank arm 32 connected with an extension 33 of the connecting rod 17, the arrangement being such that when said rod is raised to turn on the water, the valve 31 is opened, and admits water to the supply pipe and the bucket inlet hereinafter described, and when said rod is depressed the valve is closed and at the same time caused to drain the upright portion of the supply pipe, through a drainage outlet 38 which, like the pipe 28, may lead to a sewer.

The casing 24 has a port 24ª (Fig. 6) communicating with the supply pipe 23. The trunnion 14 is tubular and has a passage 14ª communicating with the bucket 12, and constituting a lateral inlet coinciding with the axis of the bucket and adapted to supply the bucket with water. The trunnion 14 has a port 14ᵇ which registers with the port 24ª and not only permits water to enter the bucket when the controlling valve 31 admits water to the supply pipe 23, but also serves as an air inlet allowing the supply pipe 23 to drain off when the controlling valve 31 closes. The pipe 23, casing 24, and inlet 14ª constitute a supply conduit which is controlled by the valve 31.

When the platform 21 is in its normal elevated position, the lever 18 and the rod 17 are held yieldingly in their normal positions by means of a spring 25 bearing on one arm of the lever 18, the rod being depressed and the bucket being held in its discharging position.

When the fore feet of an animal rest on the platform 21, the latter is depressed and the connecting rod 17 is elevated sufficiently to move the bucket to its retaining position shown by dotted lines in Fig. 1. It will now be seen that when a horse approaches the bucket 12 to drink, the bucket is automatically turned to its water-retaining position, and water is at the same time admitted thereto. When the animal leaves the platform 21, the bucket is immediately turned to its discharging position and the water is shut off therefrom, any water remaining in the bucket being discharged.

The bucket is preferably located in a fixed curb 27 from the bottom of which extends a waste pipe 28 through which the water discharged from the bucket is carried away. The bearings 15 may rise from the bottom of the curb 27 and the supply pipe 23 may pass upwardly through said bottom. The curb may be supported by a suitable standard 30 through which the waste pipe and rod extend, the platform being located at one side of the standard.

To enable the bucket to be moved to its water-retaining position manually, I provide a lever 35 fulcrumed at 36 on the standard 30 and connected at 37 with the rod 17.

The apparatus may be provided with two buckets, as indicated by Figs. 2 and 3, which two buckets may be coupled together for simultaneous movement. It is obvious that any greater number of buckets may be employed if desired, the number of platforms 21 preferably corresponding to the number of buckets.

It will be seen that the crank arms 16 and 32, and the connecting rod 17 constitute direct and positive or positively acting connections of simple and reliable character between the bucket 12 and the movable member of the controlling valve, said connections having means whereby the said valve is opened when the bucket is moved to its retaining position, held continuously open while the bucket remains in said position, and closed when the bucket is moved to its discharging position. Water is therefore continuously admitted to the bucket while the platform 21 is displaced from its normal position and shut off only when the said platform returns to its normal position.

I claim:—

1. A watering apparatus comprising a receptacle mounted to swing on a horizontal axis to discharging and receiving positions and provided with a crank arm, a conduit adapted to discharge water into the receptacle and having a controlling valve, the movable member of which is provided with a crank arm, and a rod connecting said crank arms and adapted to impart movement from one arm to the other, the valve being opened when the receptacle is in its retaining position and closed when the receptacle is in its discharging position, means being provided for yieldingly holding the rod in the position required to locate the receptacle in its discharging position and close the valve.

2. A watering apparatus comprising a receptacle mounted to swing on a horizontal axis to discharging and receiving positions, and provided with a crank arm, a conduit adapted to discharge water into the receptacle and having a controlling valve the movable member of which is provided with a crank arm, a rod connecting said crank arms to impart movement from one arm to the other, the valve being opened when the receptacle is in its retaining position and closed when the receptacle is in its discharging position, yieldingly acting means being provided for holding the rod in the position required to locate the receptacle in its discharging position and close the valve, and the valve being provided with a drainage outlet which is automatically opened by said rod and the said yieldingly acting means.

3. A watering apparatus comprising a receptacle mounted to swing on a horizontal axis to discharging and retaining positions and provided with a crank arm, a conduit adapted to discharge water into the receptacle and having a controlling valve, the movable member of which is provided with a crank arm, a rod connecting said crank arms and adapted to impart movement from one arm to the other, and external means for moving said rod in one direction to simultaneously move the receptacle to its retaining position and open the movable valve member, means being provided for yieldingly holding the rod in the position required to locate the receptacle in its discharging position and close the valve.

4. A watering apparatus comprising a receptacle mounted to swing on a horizontal axis to discharging and retaining positions and provided with a crank arm, a conduit adapted to discharge water into the receptacle and having a controlling valve, the movable member of which is provided with a crank arm, a rod connecting said crank arms and adapted to impart movement from one arm to the other, a platform depressible by the weight of an animal, and connections between said platform and rod whereby, when the platform is depressed, the rod is moved to locate the receptacle in its retaining positions and open the valve, means being provided for yieldingly holding the rod in the position required to locate the receptacle in its discharging position and close the valve.

5. A watering apparatus comprising a receptacle mounted to swing on a horizontal axis to discharging and retaining positions and provided with a crank arm, a conduit adapted to discharge water into the receptacle and having a controlling valve, the movable member of which is provided with a crank arm, a rod connecting said crank arms and adapted to impart movement from one arm to the other, a platform depressible by the weight of an animal, springs which yieldingly support the platform in a horizontal position, and connections between the platform and rod whereby, when the platform is depressed, the rod is moved to locate the receptacle in its retaining position and open the valve, means being provided for yieldingly holding the rod in the position required to locate the receptacle in its discharging position and close the valve.

6. A watering apparatus comprising a receptacle mounted to swing on a horizontal axis to discharging and retaining positions and provided with a crank arm, a conduit adapted to discharge water into the receptacle and having a controlling valve, the movable member of which is provided with a crank arm, a rod connecting said crank arms and adapted to impart movement from one arm to the other, a platform depressible by the weight of an animal, springs which yieldingly support the platform in a horizontal position, a bell crank lever fulcrumed below the platform and having an arm movable by the platform and an arm connected with said rod, the rod being movable by the depression of the platform in the direction required to locate the receptacle in its retaining position and open the valve, and a spring engaged with said lever and adapted to move the rod in the direction required to locate the receptacle in its discharging position and close the valve.

7. A watering apparatus comprising a hollow standard a curb supported thereby and having a waste pipe extending downwardly through the standard, a receptacle mounted to swing on horizontal bearings within the curb to discharging and retaining positions and provided with a crank arm, a conduit extending through said standard into the curb and adapted to discharge water into the receptacle, and having a controlling valve, the movable member of which is provided with a crank arm, said valve being located below the standard, and a rod connecting said crank arms and extending through the standard, the valve being opened when the receptacle is in its retaining position and closed when the receptacle is in its discharging position, and provided with a drainage outlet which is automatically opened when the valve is closed.

8. A watering apparatus comprising a hollow standard, a curb supported thereby and having a waste pipe extending downwardly through the standard, a receptacle mounted to swing on horizontal bearings within the curb to discharging and retaining positions and provided with a crank arm, a conduit extending through said standard into the curb and adapted to discharge water into the receptacle, and having a controlling valve, the movable member of which is provided with a crank arm, said valve being located below the standard, a rod connecting said crank arms and extending through the standard, the valve being opened when the receptacle is in its retaining position and closed when the receptacle is in its discharging position, and provided with a drainage outlet which is automatically opened when the valve is closed, a yieldingly supported platform located below the receptacle and at one side of the standard, and connections between the platform and rod whereby when the platform is depressed the rod is moved to locate the receptacle in its retaining position and open the valve, means being provided for yieldingly holding the rod in the position required to locate the receptacle in its discharging position and close the valve.

9. A watering apparatus comprising a receptacle having oppositely projecting trunnions, fixed bearings therefor, the receptacle being adapted to swing on said bearings to discharging and retaining positions, one of the trunnions being tubular and forming a lateral inlet, a casing inclosing the tubular trunnion and communicating with the inlet, a supply pipe communicating with said casing, a controlling valve in said supply pipe, an arm secured to one of said trunnions, an arm secured to the movable member of said valve, a vertically movable rod pivoted at one end to the trunnion arm and at the other end to the valve arm, and adapted, when elevated, to move the receptacle to its retaining position and open the valve, and, when depressed, to move the receptacle to its discharging position and close the valve, means being provided for normally holding the rod in its depressed position, and operating means for elevating the rod.

In testimony whereof I have affixed my signature, in presence of two witnesses.

ALBERT M. TAYLOR.

Witnesses:
A. W. HARRISON,
P. W. PEZZETTI.